Jan. 21, 1969         M. W. REDMOND, JR         3,422,603
              CHROMATOGRAPHIC INSTRUMENT
Filed Jan. 30, 1967                          Sheet 1 of 3

INVENTOR.
Melvin W. Redmond, Jr.
BY
Frank J. Thompson
ATTORNEY.

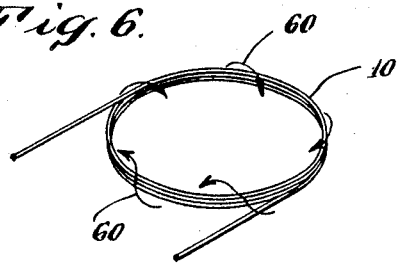
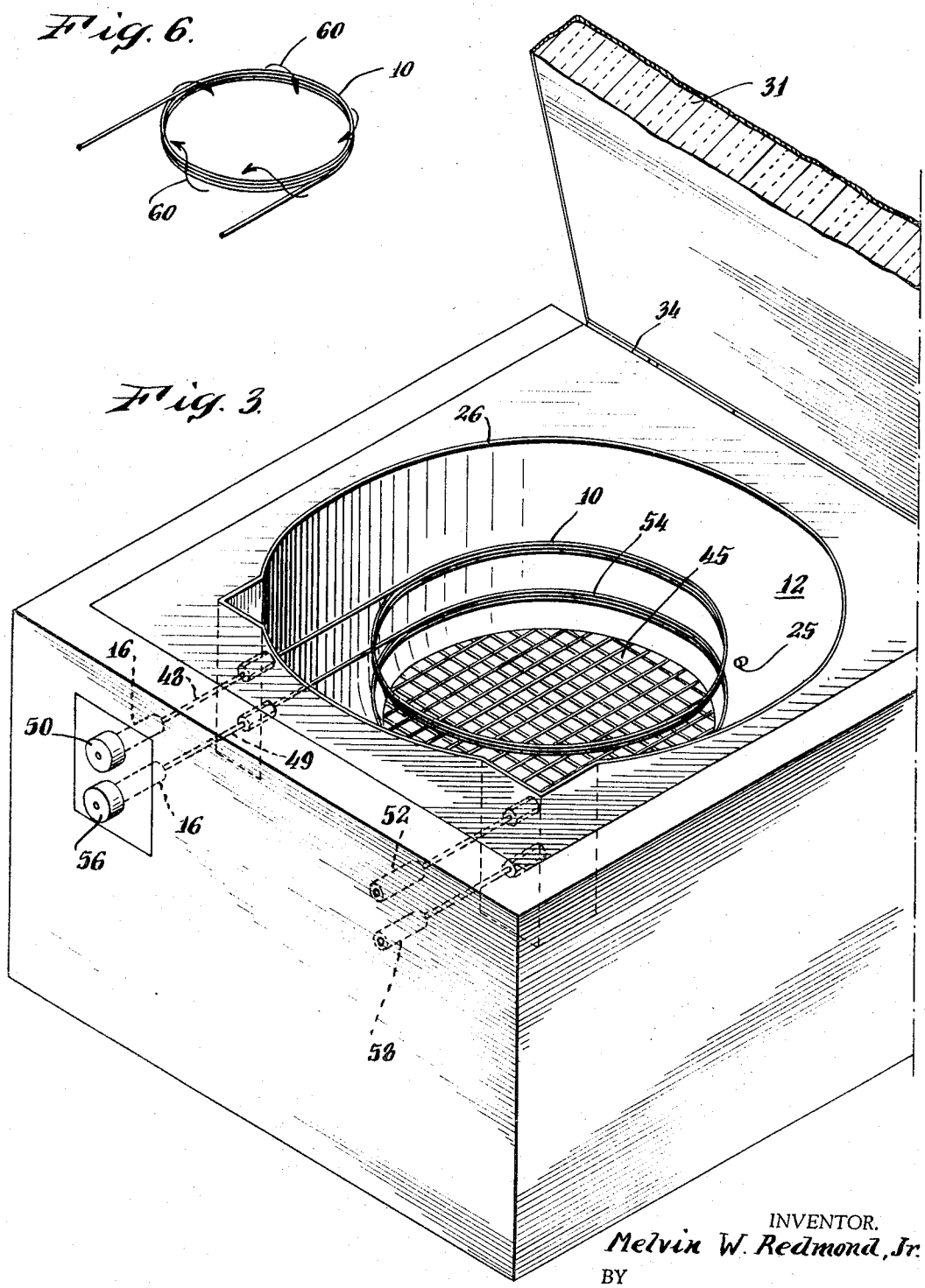

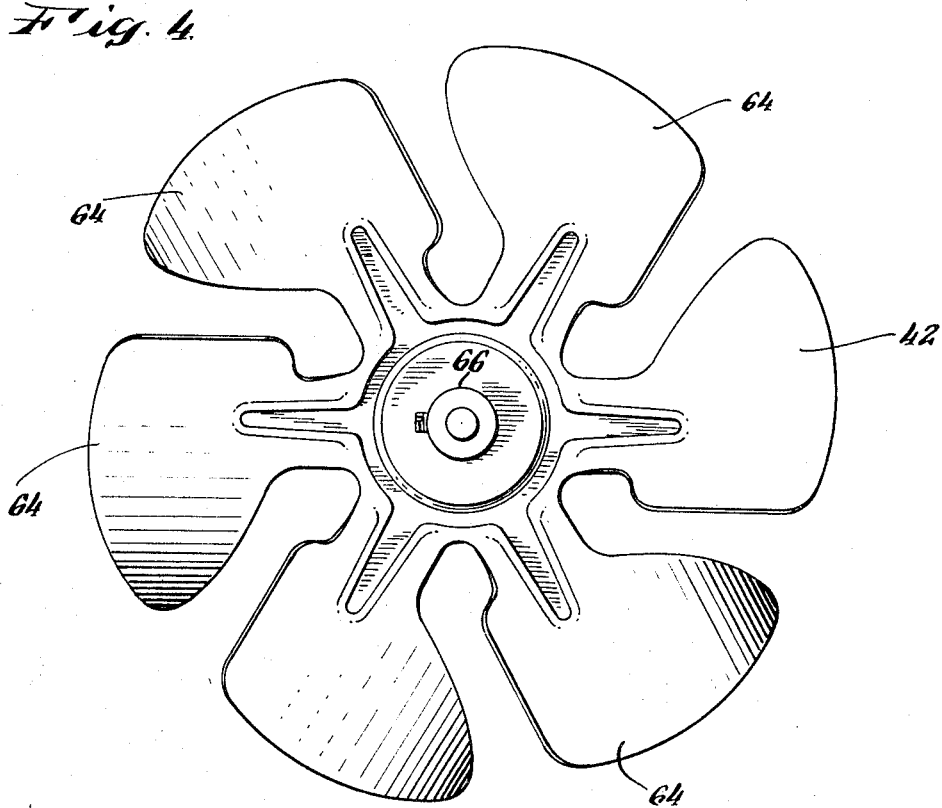
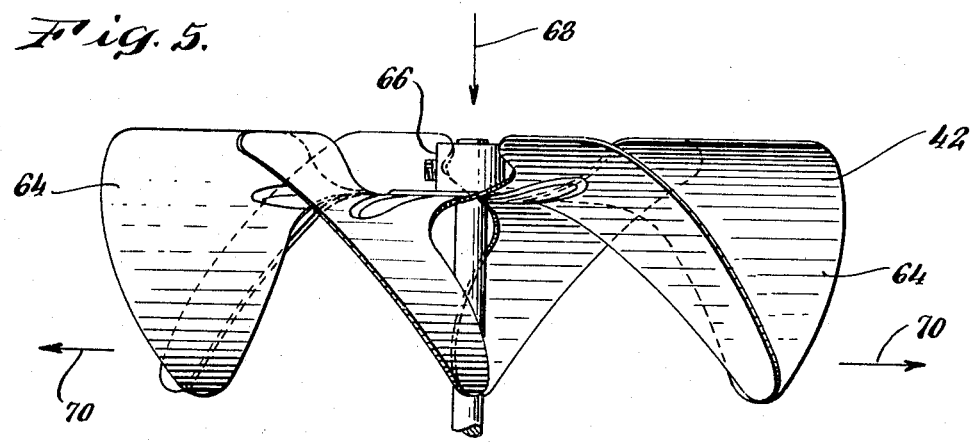

United States Patent Office 3,422,603
Patented Jan. 21, 1969

3,422,603
CHROMATOGRAPHIC INSTRUMENT
Melvin W. Redmond, Jr., West Redding, Conn., assignor to The Perkin-Elmer Corporation, Norwalk, Conn., a corporation of New York
Filed Jan. 30, 1967, Ser. No. 612,712
U.S. Cl. 55—386          9 Claims
Int. Cl. B01d 15/08

ABSTRACT OF THE DISCLOSURE

A chromatographic instrument includes an enclosed thermostatted air bath environmental chamber for housing a chromatographic separation column. A mixed flow impeller is mounted for circulating air in the chamber and is adapted for drawing air in an axial direction and discharging the air substantially at right angles to the axis. A separation column is mounted in the chamber and means provide access to the chamber for mounting and demounting the column. An air flow pattern thereby established circulates in a toroidal manner and reduces to a very large extent the creation of temperature gradients along the length of the column.

---

This invention relates to chromatographic instruments. The invention relates more particularly to means for establishing desired environmental operating conditions for separating columns employed in such instruments.

The requirements for maintaining a separating column in a chromatographic instrument at an accurately controlled temperature, or, for varying the temperature of the column in an accurately programmed manner are well known. In general, one or more separating columns are positioned in a thermostatted chamber and air within the chamber is temperature conditioned and forced to flow over the column. Because the separating characteristics of the column are closely related to the temperature thereof, it is highly desirable for the column to exhibit a uniform temperature along its length. In some chromatographic separations, relatively long column lengths are employed and under these conditions the requirements on the environmental chamber for establishing a uniform temperature along the length of the column can become severe.

Various thermostatted chamber arrangements have been employed in chromatographic apparatus. In one form utilized with spiral formed columns, an elongated rectangular chamber is partitioned along its length by a baffle. A spiral column is mounted and extends in the elongated direction in one of the partitioned sections while a centrifugal fan and heat transfer means are mounted in the other partitioned section. The air which is temperature conditioned by the heat transfer means is forced by the fan to circulate through the partitioned sections in a flow path defined by the baffle. The conditioned air then flows along the helical axis of the column and in view of a heat transfer occurring as the air passes over the column, a resultant substantial temperature gradient can exist between inlet and outlet ports of the column. In addition, this arrangement is further limited in that the overall length of the column which can be employed in a chamber of reasonable proportions is restricted due to its helical configuration.

Although the employment of flat or spiral wound configuration has satisfied to a large extent the requirement for relatively longer columns, chambers which have been used with such columns have caused undesirable temperature gradients and random temperature variations along the length of the column. In one arrangement, the temperature conditioned air is forced to flow diametrically across the spiral configuration and results in temperature variations across the column. In another arrangement, the column is positioned in a generally long cylindrically shaped chamber and an axially mounted impeller in cooperation with suitable baffling means forces the conditioned air to pass over the column. The air is drawn and exhausted in an axial direction and changes in direction of air flow are caused solely by the surfaces of the chamber and the baffling means. Substantial turbulence results and an air flow pattern conducive to uniform column temperatures is not provided. In addition, the use of baffling means increases the thermal mass of the chamber. This is particularly disadvantageous with temperature programmed chambers. Furthermore, these baffling means have added undesirable cost and complexity to the chambers.

Accordingly, it is an object of this invention to provide a chromatographic instrument having an improved environmental chamber arrangement for a separating column.

Another object of this invention is to provide a column chamber arrangement for a chromatographic instrument which exhibits relatively small temperature gradients along the length of the separating column.

A further object of this invention is to provide an environmental chamber arrangement for use in a gas chromatographic instrument which exhibits a relatively small temperature gradient along a length of the column contained therein while simultaneously permitting the use of relatively long lengths of separating column.

In accordance with features of the present invention, an instrument adapted for performing chromatographic separations includes a closed thermostatted environmental chamber. A mixed flow impeller is mounted in the chamber and is adapted for drawing air in an axial direction and for discharging air 360° radially at right angles to the fan axis. Means are provided for mounting a separating column at an axial location intermediate the fan and closure member. The impeller thus establishes a desired air flow pattern while a rotating toroidal air flow causes equal amounts of air at the same temperatures to flow over segments of the column, thereby maintaining uniform temperatures along the lengths of the column.

These and other objects and features of the invention will become apparent with reference to the following specifications and drawings wherein:

FIGURE 3 is a perspective view of the chamber arrangement constructed in accordance with the present invention;

FIGURE 4 is a plan view of a mixed flow impeller utilized in the environmental chamber constructed in accordance with the present invention;

FIGURE 5 is an elevation view of the impeller of FIGURE 4; and

FIGURE 6 is a diagram illustrating the generally toroidally shaped air flow pattern established in the chamber of FIGURES 2 and 3.

Figure 1:
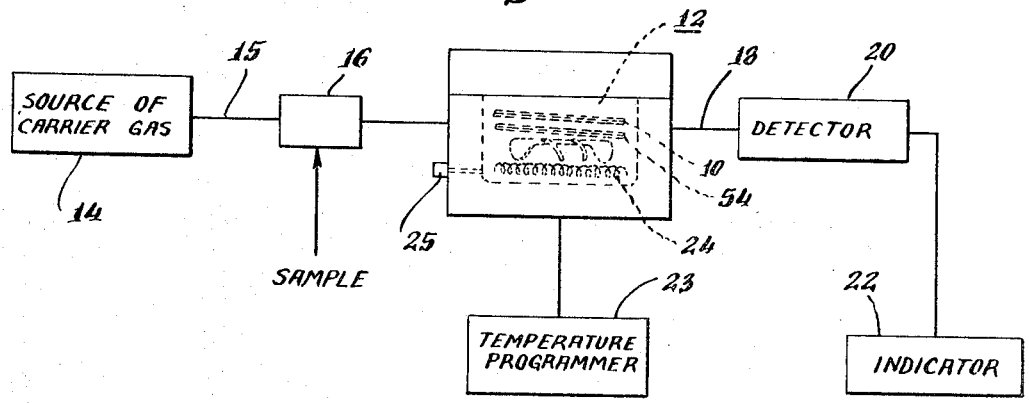
FIGURE 1 is a diagram, in block form, illustrating the general arrangement of a chromatographic instrument incorporating an embodiment of the present invention.

Referring now to FIGURE 1, an instrument for performing chromatographic separations is illustrated generally and includes a separating column 10 positioned within an environmental chamber 12. A sample under analysis is conveyed to the column by a carrier gas. An inert carrier gas is derived from a source 14 and is conducted by a suitable tubulation 15 to an injector block 16. The injector block is generally heated and a sample injected therein is vaporized and conveyed by the carrier gas to the separating column 10 via tubing. In a well known manner, the column 10 is adapted for separating the various components of the sample and for eluting these components successively in time. The eluted components of the column 10 are conveyed through tubulation 18 to a detector 20. This detector may be any of suitable type, such as a flame ionization detector or thermal conductivity detector. An electrical output signal indicative of the occurrence in time of the separated sample components and their relative concentration is provided by the detector. This electrical signal is applied to a recorder indicating means 22, such as a chart recorder, for providing a chromatogram of the separation. As previously indicated, the separating characteristics of the column in the sample are closely related to the temperature of the column and it is desirable at times to vary the temperature of the column 10 over a range of temperatures in a programmed manner. A temperature programming means 23 is provided and operates in conjunction with a thermal transfer means including a heating coil 24 and liquid coolant solenoid operated inlet valve 25 mounted to provide the desired programmed temperature variations from subambient to above ambient temperatures.

Figure 2:
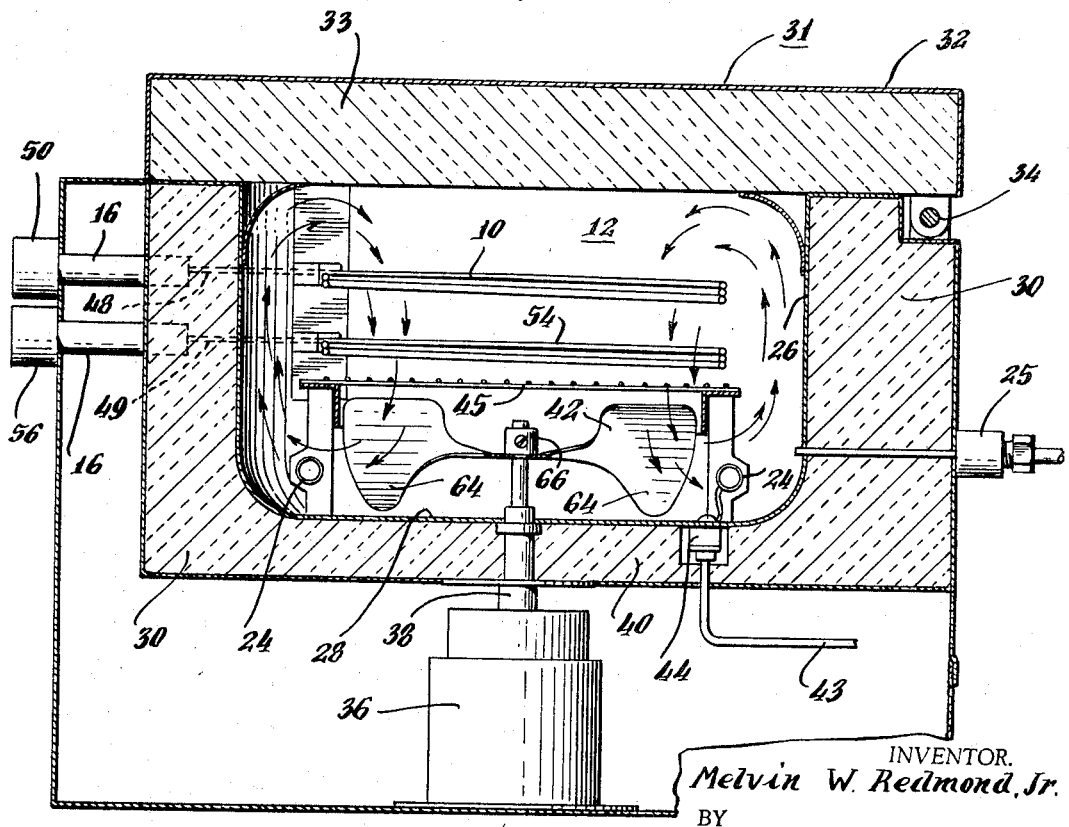
FIGURE 2 is a section view illustrating an environmental chamber arrangement constructed in accordance with the present invention.

The apparatus of FIGURE 2 includes a generally cylindrically shaped environmental chamber 12 formed of sheet metal 26, for example, and which is closed at one end 28 thereof. The chamber is thermally insulated from ambient conditions by various thicknesses of insulating materials 30. Access to the chamber 12 is provided for the instrument operator by an adjustable closure member 31 which is shown to comprise a cover formed of sheet metal 32 and insulating material 33. The cover is hinged at points 34. An electric motor 36 is mounted near the closed end 28 of the housing and a drive shaft 38 extends through an insulating thickness 40 and through the closed end 28 into a lower portion of the chamber. The drive shaft is positioned coaxially with a longitudinal axis of the generally cylindrically shaped chamber 12. An impeller 42 of the mixed-flow type is mounted on the drive shaft 38 and is rotably driven thereby for circulating air within the chamber. Air which is circulated by the impeller 42 is drawn in an axial direction from the upper portion of the chamber and is discharged radially past the heater element 24 which may comprise any conventional electric wire type heating element. Electrical current flows to the heater 24 via wires 43 and a terminal 44. A source of liquid coolant is coupled to the solenoid operated valve 25. A protective grill 45 is positioned above the impeller 42. Temperature sensing means (not shown) is positioned in the chamber and in conjunction with the programmer 23 provides desired chamber temperature.

A chromatographic separating column 10 is arranged in a closed spiral fashion and is mounted at a position along the longitudinal axis of the chamber which is between the closure member 31 and the impeller 42. Carrier gas flows to the column 10 via the internal tubulation 48. The injector block 16 of FIGURE 1 is incorporated into the body of FIGURE 2 and access to the injector 16 is provided through a septum 50. The carrier gas and sample flow through the column and elute successively in time through a port 52, shown in FIGURE 3. At times a reference column 54 is also employed. A corresponding septum 56 and outlet port 58 is provided for the column 54.

The fan impeller 42 is of a type adapted for drawing air in an axial direction and for discharging air at substantially right angles 360° about its axis without the necessity of employing a housing for directing air flow. In FIGURE 2, the circulation of air in the housing is represented by the lines and the direction by the arrowheads. Through this arrangement, the air in the chamber 12 is drawn to the impeller in an axial direction and is discharged radially. The air thus circulates in a torodial fashion as shown in FIGURE 6. The circulation of the air has two components, one component being circumferential about the toroid of FIGURE 6 and peripheral about the toroid form as indicated by the line 60. As a result, a relatively uniform temperature is maintained along the length of the columns 10 and 54 within the housing.

The impeller 42 is illustrated in greater detail in FIGURES 4 and 5. This fan includes a plurality of blades 64 extending away from a hub 66. The blades are arranged in what is termed a mixed-flow configuration and have a relatively large pitch and canter. This configuration causes the air stream which is flowing axially in the direction as shown in FIGURE 5 by the line 68 to change direction and to flow radially as indicated by the lines 70.

Thus, an improved thermostated environmental chamber in a chromatographic instrument has been described which is particularly suitable for separating columns of relatively long lengths and which is adapted for maintaining a substantially uniform temperature along the lengths of these columns.

While I have illustrated and described a particular embodiment of my invention, it will be understood that various modifications may be made therein without departing from the spirit of the invention and the scope of the appended claims.

I claim:

1. In a gas chromatographic instrument, an environmental chamber arrangement for a separating column comprising:
   an enclosed thermally insulated chamber;
   a mixed flow impeller rotatably mounted in said chamber about an axis and being so constructed and arranged to circulate air in said chamber in a toroidally shaped air flow path;
   means for mounting a separating column in said toroidal air flow path in said chamber;
   means for providing access to said chamber for mounting and demounting said column; and
   means for transferring heat for varying the temperature of air in said chamber.

2. In a gas chromatographic instrument, an environmental chamber arrangement for a separating column comprising:
   an enclosed generally cylindrically shaped, thermally insulated chamber including a wall member defining a portion of the chamber and having a longitudinal axis thereof;
   a mixed flow impeller rotatably mounted in said chamber about said axis and being so constructed and arranged to circulate air in said chamber in a toroidally shaped air flow path;
   means for mounting a separating column having a spiral configuration in said toroidal air flow path in said chamber;
   means for providing access to said chamber for mounting and demounting said column; and
   means for transferring heat for varying the temperature of air in the chamber.

3. The chamber arrangement of claim 2 wherein said mixed flow impeller is rotated in a manner for drawing air in an axial direction and for discharging air in a direction substantially at right angles to said axis.

4. The chamber arrangement of claim 3 wherein said impeller has an axial length and said heat transfer means includes an electrical heater winding mounted on a generally circular shaped form and said form is positioned about said impeller along said axial length in the path of discharged air.

5. The chamber arrangement of claim 4 wherein said chamber includes a closed end thereof and said impeller is rotatably positioned at said closed end of said chamber.

6. The chamber arrangement of claim 5 wherein said access means comprises an adjustable closure member positioned at one end of the cylindrical chamber, said impeller is positioned at an opposite end of said chamber and said column is mounted at an axial position intermediate said closure member and said impeller.

7. The chamber arrangement of claim 6 wherein said heat-transfer means includes a programmed temperature heating means.

8. The chamber arrangement of claim 2 wherein said heat transfer means includes an electrical heater winding mounted on a generally circular shaped form and said form is positioned in said toroidally shaped air flow path.

9. In a gas chromatographic instrument, an environmental chamber arrangement for a separating column comprising:

an enclosed thermally insulated chamber having a generally cylindrically shaped elongated wall member and a closure wall member positioned at a first end thereof;

said cylindrical member having a longitudinal axis;

an adjustable closure member for said chamber mounted at an opposite end thereof; for providing access to said chamber;

a rotatable motor driven shaft coaxially positioned with said longitudinal axis and extending through said closure wall member into said chamber;

a mixed flow impeller having an axial length thereof and mounted on said shaft near said closure wall member, said impeller including a plurality of blades each having a curvature near an extremity thereof and being so constructed and arranged to circulate air in said chamber in a toroidally shaped air flow path;

said cylindrical and closure wall members defining a curved wall segment extending circumferentially about the chamber and having a curvature corresponding with a curvature of said impeller blades;

an electrical heater coil positioned about said impeller along said axial length; and, a helical shaped separating column positioned in said chamber at a longitudinal position intermediate said impeller and said adjustable closure member.

References Cited

UNITED STATES PATENTS

| | | | |
|---|---|---|---|
| 2,011,298 | 8/1935 | Osbun et al. | 230—119 |
| 2,841,005 | 7/1958 | Coggeshall | 55—197 X |
| 2,963,898 | 12/1960 | Reynolds et al. | 55—386 |
| 3,164,005 | 1/1965 | Burnell et al. | 73—23.1 |
| 3,165,147 | 1/1965 | Roof et al. | 55—386 X |
| 3,305,000 | 2/1967 | Bullen et al. | 55—386 X |

REUBEN FRIEDMAN, *Primary Examiner.*

J. L. DE CESARE, *Assistant Examiner.*

U.S. Cl. X.R.

230—134